(12) United States Patent
Sasaki

(10) Patent No.: US 10,451,794 B2
(45) Date of Patent: Oct. 22, 2019

(54) DISPLAY APPARATUS

(71) Applicant: Sakai Display Products Corporation, Sakai-shi, Osaka (JP)

(72) Inventor: Tomoo Sasaki, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/126,256

(22) PCT Filed: Apr. 16, 2014

(86) PCT No.: PCT/JP2014/060859
§ 371 (c)(1),
(2) Date: Sep. 14, 2016

(87) PCT Pub. No.: WO2015/159397
PCT Pub. Date: Oct. 22, 2015

(65) Prior Publication Data
US 2017/0090109 A1 Mar. 30, 2017

(51) Int. Cl.
*G02F 1/13357* (2006.01)
*F21V 8/00* (2006.01)
*G02F 1/1335* (2006.01)

(52) U.S. Cl.
CPC ......... *G02B 6/0085* (2013.01); *G02F 1/1336* (2013.01); *G02F 1/133615* (2013.01); *G02F 2001/133628* (2013.01)

(58) Field of Classification Search
USPC ....................................................... 362/615
See application file for complete search history.

(56) References Cited

U.S. PATENT DOCUMENTS

2010/0066937 A1* 3/2010 Yamashita ........... G02B 6/0085
349/58
2013/0051047 A1 2/2013 Endoh et al.

FOREIGN PATENT DOCUMENTS

| CN | 202835064 | | 3/2013 |
|---|---|---|---|
| CN | 103591568 | A | 2/2014 |
| JP | H09-147617 | A | 6/1997 |
| JP | 2004-171948 | A | 6/2004 |
| JP | 2006-235179 | A | 9/2006 |
| JP | 2006-293182 | A | 10/2006 |
| JP | 2008-299181 | A | 12/2008 |
| JP | 2009-224207 | A | 10/2009 |
| JP | 2010-072262 | A | 4/2010 |
| JP | 2013-049346 | A | 3/2013 |

* cited by examiner

*Primary Examiner* — Rafferty D Kelly
(74) *Attorney, Agent, or Firm* — Rudy J. Ng; Bret E. Field; Bozicevic, Field & Francis LLP

(57) ABSTRACT

The present invention provides a display apparatus capable of exhibiting excellent heat dissipation properties with a simpler structure, and increasing productivity of products by reducing the number of components. In a television receiving apparatus (100) which includes a light guide plate (5) configured to emit light from one surface thereof, the light entering a side surface of the light guide plate (5), and displays an image by the light emitted from the light guide plate (5), the television receiving apparatus (100) includes a heat absorption plate (6) which is integrally molded with the light guide plate (5), wherein one surface of the heat absorption plate (6) contacts with the other surface of the light guide plate (5), such that the heat absorption plate (6) absorbs heat emitted by the light guide plate (5).

16 Claims, 8 Drawing Sheets

DISPLAY APPARATUS

This application is the national phase under 35 U.S.C. § 371 of PCT International Application No. PCT/JP2014/060859 which has an International filing date of Apr. 16, 2014 and designated the United States of America.

BACKGROUND

Technical Field

The present invention relates to a display apparatus which includes a light guide plate configured to emit light from one surface thereof, the light entering a side surface of the light plate, and displays an image by the light from the light guide plate.

Description of Related Art

Recently, liquid crystal display apparatuses with a large screen have been widely distributed, as well as high definition of an image is required.

Meanwhile, Japanese Patent Laid-Open Publication No. 2010-072262 discloses a liquid crystal display apparatus which is provided with a recess part extending from an LED light source block to at least one part of a light guide plate or a reflection sheet, in an end portion of a panel frame on which the LED light source block mounted, and is further provided with a reflection-heat insulation member extending from an end portion of the LED light source block to at least one part of the light guide plate or the reflecting sheet, and fixed to the panel frame, in the recess part, such that an extraction efficiency of light is improved, and a deterioration in an optical member is suppressed, thus to have good optical properties.

In addition, Japanese Patent Laid-Open Publication No. 2006-293182 discloses a backlight unit for a liquid crystal display apparatus having excellent heat dissipation properties, which includes: a plate type heat dissipation part with pipe parts; LED light sources disposed at side end portions of the plate type heat dissipation part; and heat reception part which is configured to receive heat by contacting with the LED light sources, and are connected to the plate type heat dissipation part.

SUMMARY

Meanwhile, with larger size and higher definition of the liquid crystal display apparatus, it is necessary to supply a high power to the light sources (for example, LEDs).

And thereby, a heating value during operation is increased in such the light sources and the liquid crystal display apparatus.

Whereas, suppression of such the heat generation or heat dissipation is not considered in the above liquid crystal display apparatus of Japanese Patent Laid-Open Publication No. 2010-072262, and it is not possible to cope with the same.

In addition, in Japanese Patent Laid-Open Publication No. 2006-293182, heat from the LED light sources is radiated by providing the plate type heat dissipation part, but the apparatus has a complicated configuration requiring the pipe parts, the heat reception part, and the like, and production costs thereof are increased and productivity is also deteriorated.

In consideration of the above-mentioned circumstances, it is an object of the present invention to provide a display apparatus which includes a light guide plate configured to emit light from one surface thereof, the light entering a side surface of the light guide plate, and displays an image by the light from the light guide plate, wherein the display apparatus includes a heat absorption plate which is integrally molded with the light guide plate, and is configured so that one surface thereof contacts with the other surface of the light guide plate, which is opposite to the one surface of the light guide plate, to absorb heat from the light guide plate, such that it is possible to exhibit excellent heat dissipation properties with a simpler structure, and increase productivity by reducing the number of components.

According to one embodiment of the present invention, there is provided a display apparatus which includes a light guide plate configured to emit light from one surface thereof, the light entering a side surface of the light guide plate, and displays an image by the light from the light guide plate, comprising: a heat absorption plate which is integrally molded with the light guide plate, and is configured so that one surface thereof contacts with the other surface of the light guide plate to absorb heat from the light guide plate.

According to the present embodiment, since the heat absorption plate is integrally molded with the light guide plate, the number of components may be reduced. In addition, the heat absorption plate absorbs the heat emitted by the light guide plate from the other surface of the light guide plate.

In the display apparatus according to the embodiment of the present invention, the heat absorption plate may have a hollow portion, and coolant may be injected into the hollow portion.

According to the present embodiment, the heat absorbed by the heat absorption plate from the other surface of the light guide plate is cooled by the coolant in the hollow portion. Accordingly, it is possible to efficiently dissipate the heat emitted by the light guide plate.

In the display apparatus according to the embodiment of the present invention, the heat absorption plate may have a convex part and a concave part on the other surface of the heat absorption, which is opposite to the one surface of the heat absorption plate.

According to the present embodiment, since the other surface of the heat absorption plate has the convex part and concave part, a specific surface area of the other surface of the heat absorption is increased, and the heat is more effectively dissipated. In addition, a strength of the other surface of the heat absorption is increased, and a deformation of the heat absorption plate is prevented.

In the display apparatus according to the embodiment of the present invention, the one surface of the heat absorption plate may have a white color.

According to the present embodiment, the one surface of the heat absorption plate which contacts with the other surface of the light guide plate has a white color, and reflects the light emitted through the other surface of the light guide plate toward the one surface of the light guide plate, such that brightness in image display is increased.

In the display apparatus according to the embodiment of the present invention, it is preferred that there is provided a heat dissipation plate which contacts with the other surface of the heat absorption plate.

According to the present embodiment, the heat absorbed by the heat absorption plate from the other surface of the light guide plate is cooled by the coolant injected into the hollow portion, and is conducted to the heat dissipation plate to be dissipated in the air.

In the display apparatus according to the embodiment of the present invention, it is preferred that there is provided an optical sheet provided so as to face the one surface of the light guide plate; and an interval holding part which is provided at edge portion of the one surface of the light guide plate, and is configured to hold an interval between the light guide plate and the optical sheet, in this case, the interval holding part may have a hollow portion.

According to the present embodiment, since the interval holding part has the hollow portion inside thereof, it is possible to be deformed in a certain degree, and for example, when an impact is applied thereto form an outside, the interval holding part absorbs the impact and holds the interval between the light guide plate and the optical sheet.

In the display apparatus according to the embodiment of the present invention, it is preferred that there is provided a display panel configured to display an image using the light entering through the optical sheet, in this case, the interval holding part may be configured so as to hold an interval between the optical sheet and the display panel.

According to the present embodiment, the interval holding part is configured so as to maintain the interval between the optical sheet and the display panel, as well as the interval between the light guide plate and the optical sheet, such that it is possible to further reduce the number of components.

In the display apparatus according to the embodiment of the present invention, the interval holding part, the light guide plate, and the heat absorption plate may be integrally molded.

According to the present embodiment, the interval holding part, the light guide plate, and the heat absorption plate are integrally molded with each other, such that the number of components is reduced, and an assembly process is simplified to increase productivity.

In the display apparatus according to the embodiment of the present invention, it is preferred that there is provided a light source provided in the vicinity of one side surface of the light guide plate, in this case, the convex part of the heat absorption plate is preferred to be provided on the edge portion relating to the one side surface of the light guide plate.

According to the present embodiment, since the convex part of the heat absorption plate is provided on the edge portions of the light guide plate relating to the one side surface of the light guide plate, in the vicinity of the light source, when the heat from the light source which causes heating of the light guide plate is conducted to the light guide plate, the heat is absorbed before being diffused throughout the entirety of the light guide plate.

In the display apparatus according to the embodiment of the present invention, it is preferred that the light source has light emitting elements and a substrate of which one surface mounts the light emitting elements, a hollow heat absorption part configured to absorb heat from the substrate may be provided as to facing the other surface of the substrate, which is opposite to the one surface of the substrate, and the heat absorption part may be integrally molded with the heat absorption plate.

According to the present embodiment, in the light source, the heat emitted by the light emitting elements is absorbed, through the substrate, by the heat absorption part facing the other surface of the substrate, and the absorbed heat is dissipated through the heat absorption plate.

According to the present embodiment, since the heat absorption plate of which one surface contacts with the other surface of the light guide plate is integrally molded with the light guide plate to absorb heat from the light guide plate, it is possible to exhibit excellent heat dissipation properties with a simpler structure, and increase productivity by reducing the number of components.

The above and further objects and features will move fully be apparent from the following detailed description with accompanying drawings.

DETAILED DESCRIPTION

Hereinafter, an example in which a display apparatus according to embodiments of the present invention is applied to a television receiving apparatus will be described in detail with reference to the accompanying drawings.

Embodiment 1

Figure 1:
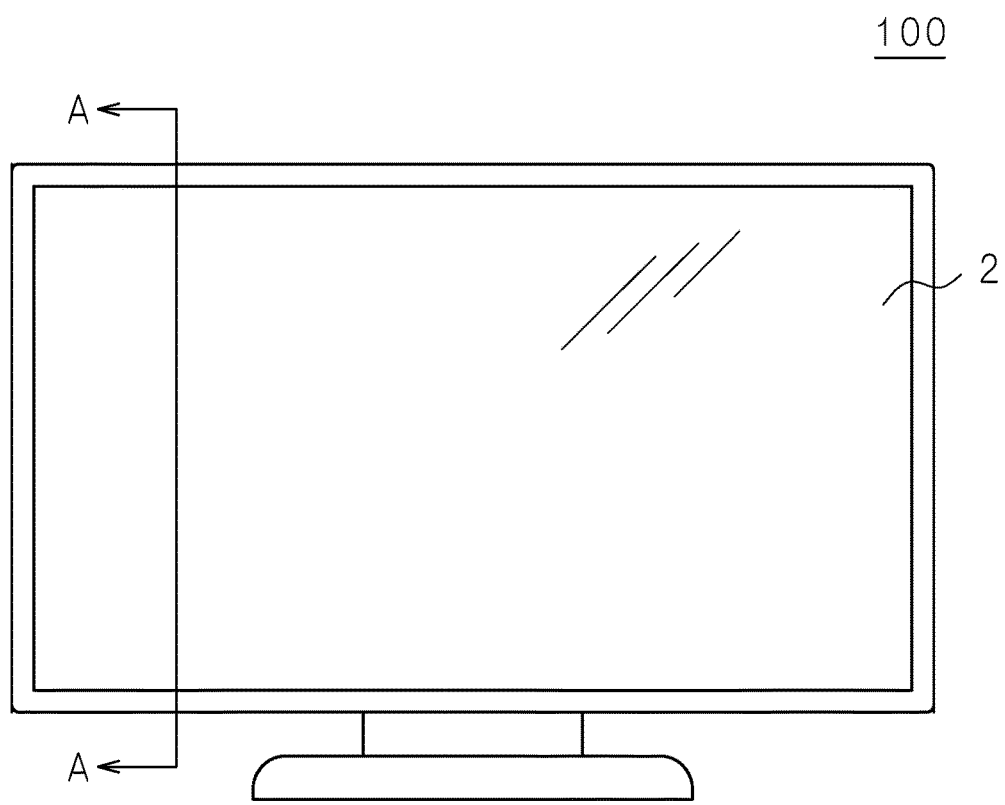
FIG. 1 is a front view illustrating an appearance of a television receiving apparatus according to Embodiment 1 of the present invention.

FIG. 1 is a front view illustrating an appearance of a television receiving apparatus according to Embodiment 1 of the present invention. In FIG. 1, a television receiving apparatus 100 according to Embodiment 1 of the present invention is illustrated. Hereinafter, for the convenience of explanation, a horizontal direction and a vertical direction in the drawings are referred to as a lateral direction and a longitudinal direction, respectively.

Figure 2:
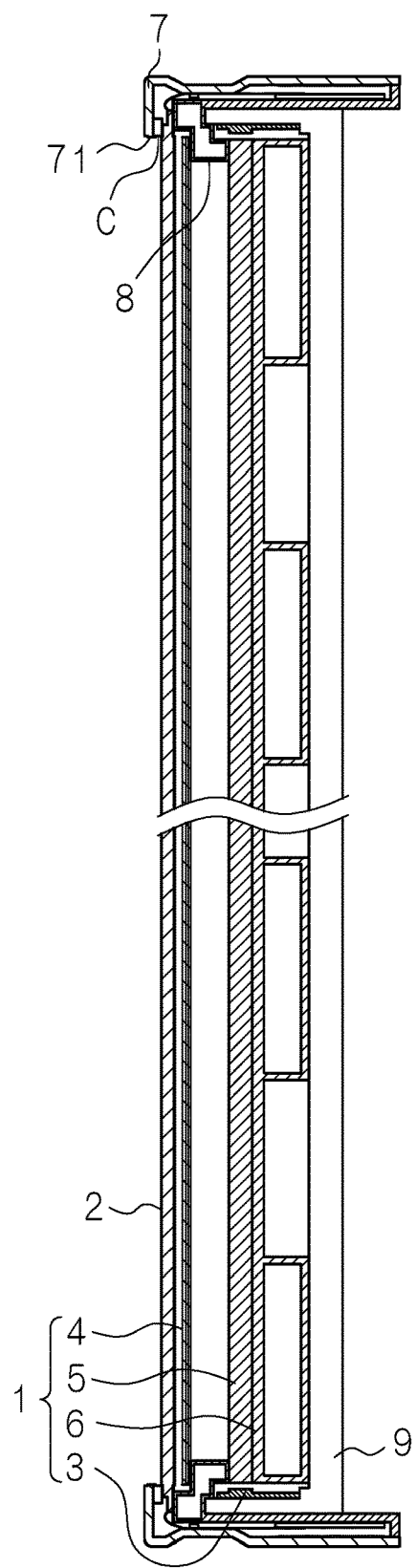
FIG. 2 is a longitudinal sectional view taken on line A-A in FIG. 1.

FIG. 2 is a longitudinal sectional view taken on line A-A in FIG. 1. The television receiving apparatus 100 according to Embodiment 1 of the present invention, as illustrated in FIG. 1, includes, at a front side thereof, a rectangular liquid crystal display panel 2 which displays an image on one surface of the liquid crystal display panel 2. In addition, a light source device 1 which irradiates the liquid crystal display panel 2 with light is disposed on a rear side of the liquid crystal display panel 2.

The light source device 1 includes light source units 3, an optical sheet 4, a light guide plate 5, and a heat absorption plate 6. In addition, FIG. 3 is an enlarged view enlarging a part of FIG. 2.

The optical sheet 4 is disposed so that one surface thereof faces the other surface of the liquid crystal display panel 2, which is opposite to the one surface of the liquid crystal display panel 2, the light guide plate 5 is disposed so that one surface thereof faces the other surface of the optical sheet 4, which is opposite to the one surface of the optical sheet 4, and the heat absorption plate 6 is disposed so that one surface thereof faces the other surface of the light guide plate 5, which is opposite to the one surface of the light guide plate 5.

A front cover 7 is disposed on edge sides of the liquid crystal display panel 2. The front cover 7 has a display window 71 with an opening having a rectangular shape corresponding to a shape of the one surface of the liquid crystal display panel 2 viewed from a user. The user may view an image displayed on the one surface of the liquid crystal display panel 2 through the display window 71.

Figure 3:
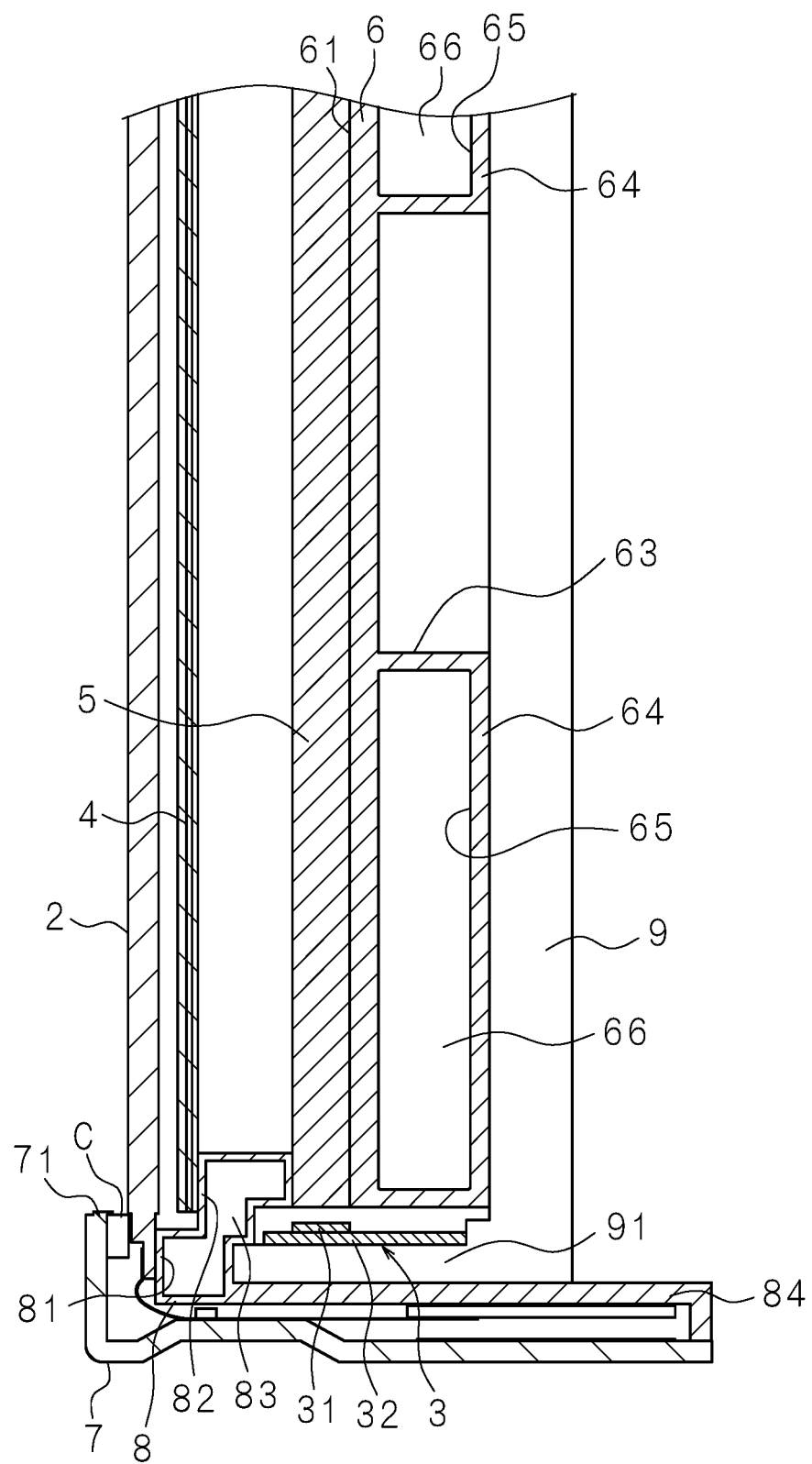
FIG. 3 is an enlarged view enlarging a part of FIG. 2.

In addition, as illustrated in FIG. 3, peripheral edge portion of the one surface of the liquid crystal display panel 2 are covered with the display window 71. More particularly, the display window 71 holds the liquid crystal display panel 2 by pressing the peripheral edge portion of the liquid crystal display panel 2 to interval holding part 8 described below through cushions C provided along the peripheral edge portion of the one surface of the liquid crystal display panel 2.

Further, the liquid crystal display panel 2 is provided with a polarizing plate (not illustrated) on the other surface thereof, and is configured so that light entering through the polarizing plate is separated into P-waves (horizontal polarizing component) and S-waves (vertical polarizing component), then only the P-waves are transmitted toward the one surface of the liquid crystal display panel 2, and the S-waves are absorbed by the polarizing plate. The liquid crystal display panel 2 may be an electrophoresis liquid crystal panel, for example.

The optical sheet 4 is a publicly known sheet that functions to diffuse and collect, etc., light which is emitted from the light source unit 3 and enters the optical sheet 4 through the light guide plate 5, so as to more uniformly emit the light toward the liquid crystal display panel 2. For example, the optical sheet 4 includes two diffusion sheets, and one prism sheet, wherein the prism sheet is disposed between the two diffusion sheets.

One diffusion sheet of the two diffusion sheets, which is disposed proximal to the light guide plate 5, is an optical sheet that functions to diffuse light entering from the light source unit 3 through the light guide plate 5 and allow the light to enter the prism sheet. In addition, the prism sheet is an optical sheet that functions to collect the light entering through the one diffusion sheet and emit the light toward the other diffusion sheet. The light passing through the prism sheet enters the other diffusion sheet perpendicular to the prism sheet.

The other diffusion sheet of the two diffusion sheets, which is disposed proximal to the liquid crystal display panel 2, is an optical sheet that functions to again diffuse the light entering through the prism sheet to have a more uniform luminance distribution and emit the light toward the liquid crystal display panel 2.

The rectangular light guide plate 5 is disposed proximal to the other surface of the optical sheet 4. The light guide plate 5 guides light emitted by the light source unit 3 to the optical sheet 4 (liquid crystal display panel 2). For example, the light guide plate 5 may be configured in such a manner that the one surface thereof facing the other surface of the optical sheet 4 has an emitting surface on which a pattern is formed so that the light entering the light guide plate 5 from the light source unit 3 is progressed in the liquid crystal display panel 2 direction. Thereby, the light guide plate 5 may convert the light entering from the light source unit 3 into flat light and uniformly transmit the light to the optical sheet 4 through the emitting surface.

In addition, the light guide plate 5 is made of, for example, a high transparency acrylic resin, and the heat absorption plate 6 is disposed on the other surface of the light guide plate 5 so that one surface 61 of the heat absorption plate 6 contacts with the other surface of the light guide plate 5.

The heat absorption plate 6 is made of, for example, plastic, and the one surface 61 has substantially the same shape and the size as the light guide plate 5. The one surface 61 has a white color having good reflecting properties, thereby has a function to reflect the light which enters the light guide plate 5 from the light source unit 3 and is emitted from the other surface of the light guide plate 5, and return the light toward the emitting surface of the light guide plate 5. In addition, the color of the one surface 61 is not limited to the white, and may be any color which is an achromatic color and can achieve a purpose of reflecting the light emitted from the other surface of the light guide plate 5.

Further, the heat absorption plate 6 is formed in such a manner that the other surface of the heat absorption plate 6, which is opposite to the one surface of the heat absorption plate 6 has convex parts and concave parts. Since the other surface of the heat absorption plate 6 has the convex parts and concave parts, a strength of the heat absorption plate 6 is increased, and the heat absorption plate 6 play a role of a spacer with being disposed between the light guide plate 5 and a heat dissipation plate 9 to be described below. In other words, by forming the heat absorption plate 6 so as to have the convex parts and concave parts on the other surface of the heat absorption plate 6, it is possible to eliminate a so-called backlight chassis for supporting the other surface of the heat absorption plate 6.

Convex parts 64, 64, . . . and 64, and concave parts 63, 63 and . . . 63 are formed on the other surface of the heat absorption plate 6, and the convex part 64 has a hollow portion 65 inside thereof. Accordingly, the convex part 64 (and the concave part 63) may be deformed within a prescribed range, such that it is possible to hold an interval between the light guide plate 5 as the spacer irrespective of a surface shape of the heat dissipation plate 9.

In addition, a coolant 66 is injected into the hollow portion 65 of the convex part 64 in the heat absorption plate 6. Accordingly, heat emitted by the light guide plate 5 is cooled by the coolant 66 of the convex part 64 through the one surface 61 of the heat absorption plate 6, such that it is possible to prevent the light guide plate 5 (or the light source device 1) from being overheated.

Meanwhile, two heat dissipation plates 9 are disposed proximal to the other surface of the heat absorption plate 6 in such a manner that one surface of the heat dissipation plate 9 contacts with the other surface of the heat absorption plate 6. The heat dissipation plate 9 is made of, for example, aluminum having good thermal conductivity. That is, the convex part 64 facing the other surface of the heat absorption plate 6 contacts with the one surface of the heat dissipation plate 9.

Figure 4:
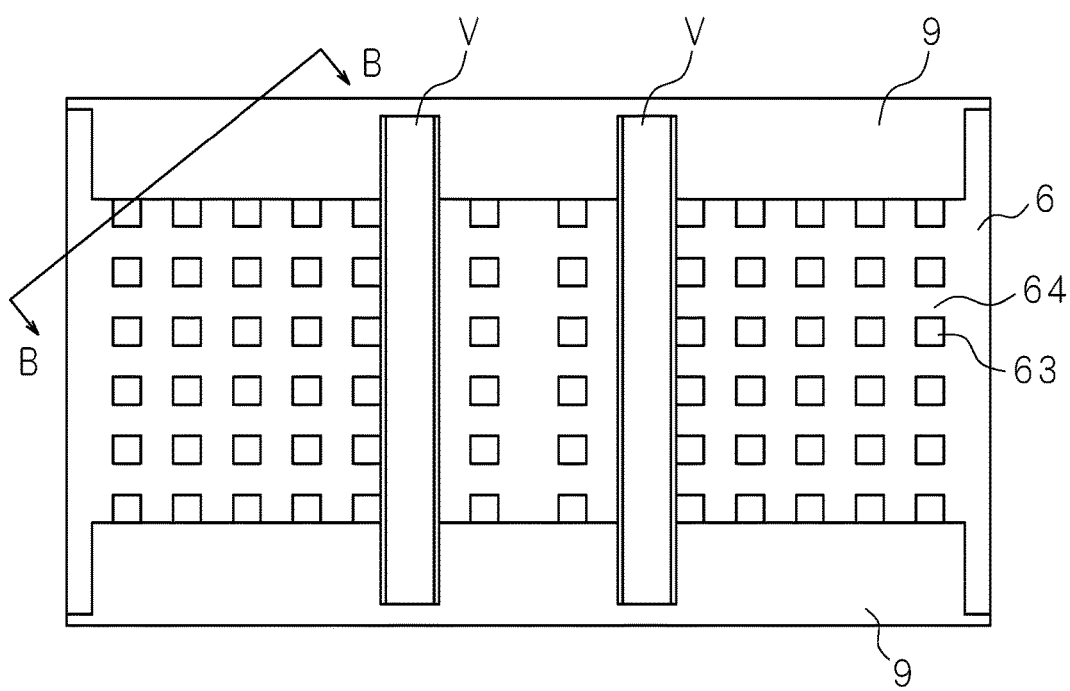
FIG. 4 is an explanatory view describing an arrangement of a heat dissipation plate in the television receiving apparatus according to Embodiment 1 of the present invention.
Figure 5:
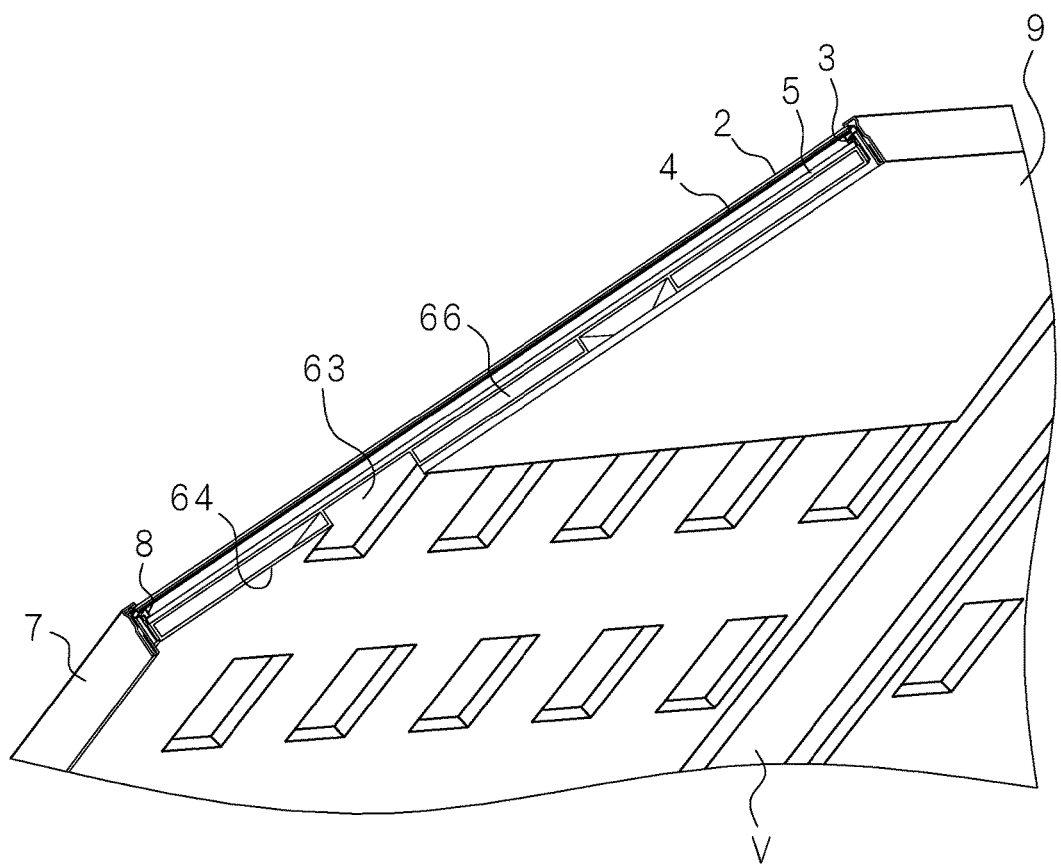
FIG. 5 is a partial cross-sectional view taken on line B-B of FIG. 4.

FIG. 4 is an explanatory view describing an arrangement of the heat dissipation plate 9 in the television receiving apparatus 100 according to Embodiment 1 of the present invention, and FIG. 5 is a partial cross-sectional view taken on line B-B of FIG. 4.

The heat dissipation plate 9 has a strip shape, in which a longitudinal dimension thereof is substantially the same as the longitudinal dimension of the light guide plate 5 or the heat absorption plate 6. In addition, the heat dissipation plates 9 are respectively provided at both edge portions of the light guide plate 5 or the heat absorption plate 6 along long sides thereof. Further, along the other surface of the substrate 32, the heat dissipation plate 9 is provided with a bent portion 91 which faces the other surface of the substrate 32 of the light source unit 3 to be described below, the other surface of the substrate 32 being opposite to the one surface of the substrate 32. In other words, an end of the heat dissipation plate 9 near the light source unit 3 is bent in a thickness direction of the heat dissipation plate 9.

Such the heat dissipation plate 9 dissipates heat in the air, the heat emitted by the light guide plate 5 and conducted to the heat dissipation plate 9 through the heat absorption plate 6. That is, the heat emitted by the light guide plate 5 (and the light source unit 3) is cooled by the coolant 66 of the convex part 64 through the one surface 61 of the heat absorption plate 6, and the heat cooled by the coolant 66 is conducted to the heat dissipation plate 9. Further, the heat conducted from the convex part 64 (i.e., the coolant 66) to the heat dissipation plate 9 is thermally diffused throughout the entirety of the heat dissipation plate 9, and dissipated in the air from the entirety of the other surface of the heat dissipation plate 9 which is opposite to the one surface of the heat dissipation plate 9.

In the present invention, since the television receiving apparatus 100 has the above-described configuration, it is possible to effectively cool the heat emitted by the light guide plate 5 (and the light source unit 3). That is, since the coolant 66 is injected into the hollow portion 65 of the convex part 64, an amount of absorption of heat from the light guide plate 5 is more increased than a case in which the coolant 66 is not injected into the hollow portion 65.

In addition, since the coolant 66 is a liquid, thermal conduction to the heat dissipation plate 9 is more easily performed than the case in which the coolant 66 is not injected into the hollow portion 65.

Further, the heat from the light source unit 3 (and the substrate 32) is diffused throughout the entirety of the heat dissipation plate 9 through the bent portion 91, and is dissipated from the entirety of the other surface of the heat dissipation plate 9 in the air, such that it is possible to directly dissipate the heat emitted by the light source unit 3 therethrough.

The present invention is not limited to the above description, and in the television receiving apparatus 100 according to the present invention, it is possible to further attach brackets V and V of the VESA standards to the other surface of the heat dissipation plate 9 or the heat absorption plate 6 (in the concave part 63).

Further, the television receiving apparatus 100 according to the present invention includes interval holding parts 8 configured to hold each of the liquid crystal display panel 2, the optical sheet 4 and the light guide plate 5 at a prescribed interval. The interval holding parts 8 are provided at edge portions of the liquid crystal display panel 2 along long sides thereof, the optical sheet 4 and the light guide plate 5. The interval holding part 8 is formed in a crank shape in a longitudinal sectional view, as illustrated in FIGS. 2 and 3, and has two stepped bent portion.

In other words, the interval holding part 8 includes two plane portions 81 and 82 which are parallel to the liquid crystal display panel 2, the optical sheet 4 and the light guide plate 5, and one end portion of the interval holding part 8 with the crank shape is disposed between the optical sheet 4 and the light guide plate 5. One plane portion 81 is formed at the other end portion of the crank-shape of the interval holding part 8, and the other plane portion 82 is formed between the one end portion and the other end portion of the crank-shape of the interval holding part 8. Hereinafter, the one end portion of the crank-shape and the other end portion of the crank-shape are briefly referred to as one end portion and the other end portion of the interval holding part 8, respectively.

The edge portion of the optical sheet 4 is placed on the plane portion 82, and as described above, the one end portion of the interval holding part 8 is disposed between the optical sheet 4 and the light guide plate 5, such that the optical sheet 4 and the light guide plate 5 are held while maintaining a constant interval therebetween.

In addition, the edge portion of the liquid crystal display panel 2 is placed on the plane portion 81. Thereby, the liquid crystal display panel 2 and the optical sheet 4 are held while maintaining a constant interval therebetween.

Further, the interval holding part 8 has a hollow portion 83 inside thereof. As such, since the interval holding part 8 has the hollow portion 83, it is possible to be deformed within a prescribed range, and play a role of a so-called cushion. Accordingly, the interval holding part 8 may hold the liquid crystal display panel 2, the optical sheet 4 and the light guide plate 5 while absorbing an impact from an outside.

Furthermore, the interval holding part 8 has a white color, and thereby reflecting light from the light guide plate 5 and the optical sheet 4. That is, since the light from the light guide plate 5 and the optical sheet 4 is reflected by the interval holding part 8, in the edge portion of the interval holding part 8, an occurrence of local unevenness in luminance may be prevented.

Figure 6:
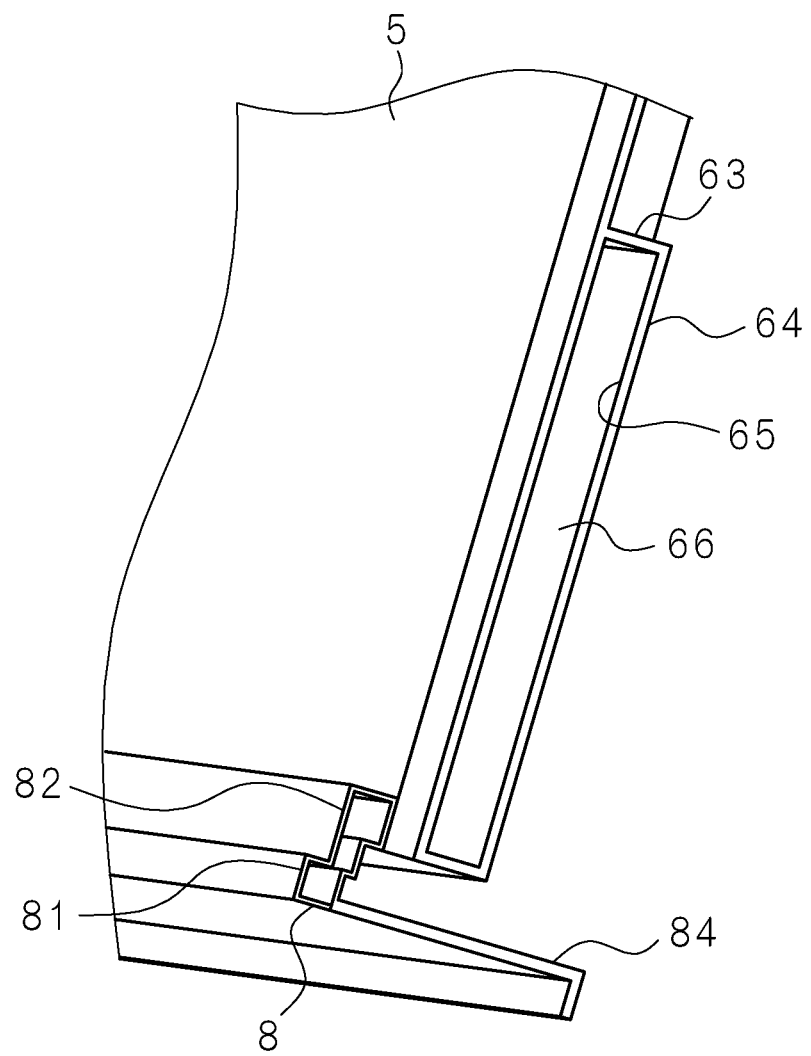
FIG. 6 is an exemplified view illustrating an interval holding part, a light guide plate, and a heat absorption plate which are integrally molded with each other, in the television receiving apparatus according to Embodiment 1 of the present invention.

Meanwhile, in the television receiving apparatus 100 according to the present invention, the interval holding part 8, the light guide plate 5 and the heat absorption plate 6 are integrally molded. FIG. 6 is an exemplified view illustrating the interval holding part 8, the light guide plate 5, and the heat absorption plate 6 which are integrally molded, in the television receiving apparatus 100 according to Embodiment 1 of the present invention.

As illustrated in FIG. 6, in the television receiving apparatus 100 according to the present invention, the interval holding part 8, the light guide plate 5 and the heat absorption plate 6 are integrally molded, and these components are molded by, for example, a gas-assist molding method. Such the gas-assist molding method is a publicly known technique in which cavities are formed in a product by injecting gases into a mold during injection molding, and therefore will not be described in detail.

Further, in television receiving apparatus 100 according to the present invention, a so-called two-color molding method may be further used in the integral molding of the interval holding part 8, the light guide plate 5 and the heat absorption plate 6. Such the two-color molding method is a publicly known technique which is capable of obtaining a product having a plurality of colors by sequential injection using a plurality of nozzles during injection molding, and therefore will not be described in detail.

In the television receiving apparatus 100 according to the present invention, by using the two-color molding method, as described above, it is possible to form only one surface of the heat absorption plate 6 and the interval holding part 8 in a white color. In addition, by using the two-color molding method, bosses for attaching the brackets V and V may be previously prepared on the other surface of the heat dissipation plate 9 or the heat absorption plate 6 (in the concave part 63).

As such, in the television receiving apparatus 100 according to the present invention, the interval holding part 8, the light guide plate 5 and the heat absorption plate 6 are integrally molded. Further, as described above, the backlight chassis may be eliminated. Accordingly, the assembly of product may be facilitated, and a manufacturing process becomes simplified, as well as productivity of products may be increased.

Furthermore, the other end portion of the interval holding part 8 is provided with a leg portion 84 which extends in a direction from the light guide plate 5 to the heat absorption plate 6. The leg portion 84 is fitted to an outer side of the heat dissipation plate 9 (specifically, the bent portion 91), thereby the heat dissipation plate 9 is attached to the integrated object of the interval holding part 8, the light guide plate 5 and the heat absorption plate 6.

Meanwhile, the light source unit 3 is provided in the vicinity of one side surface of the light guide plate 5 in a longitudinal direction. The light source unit 3 has the strip-shaped substrate 32 disposed to face the one side surface of the light guide plate 5, and a plurality of light sources 31, 31, . . . and 31 mounted on the one surface of the substrate 32 in the length direction of the substrate 32.

The light source 31 may be, for example, a cold cathode fluorescent lamp (CCFL), external electrode fluorescent lamp (EEFL), hot cathode fluorescent lamp (HCFL), light emitting diode (LED) or the like.

Embodiment 2

In Embodiment 1, the case in which the heat absorption plate 6 has substantially the same shape and the size as the light guide plate 5, and the convex parts 64 and the concave parts 63 are wholly formed on the other surface of the heat absorption plate 6 has been described, but the present invention is not limited thereto.

Figure 7:
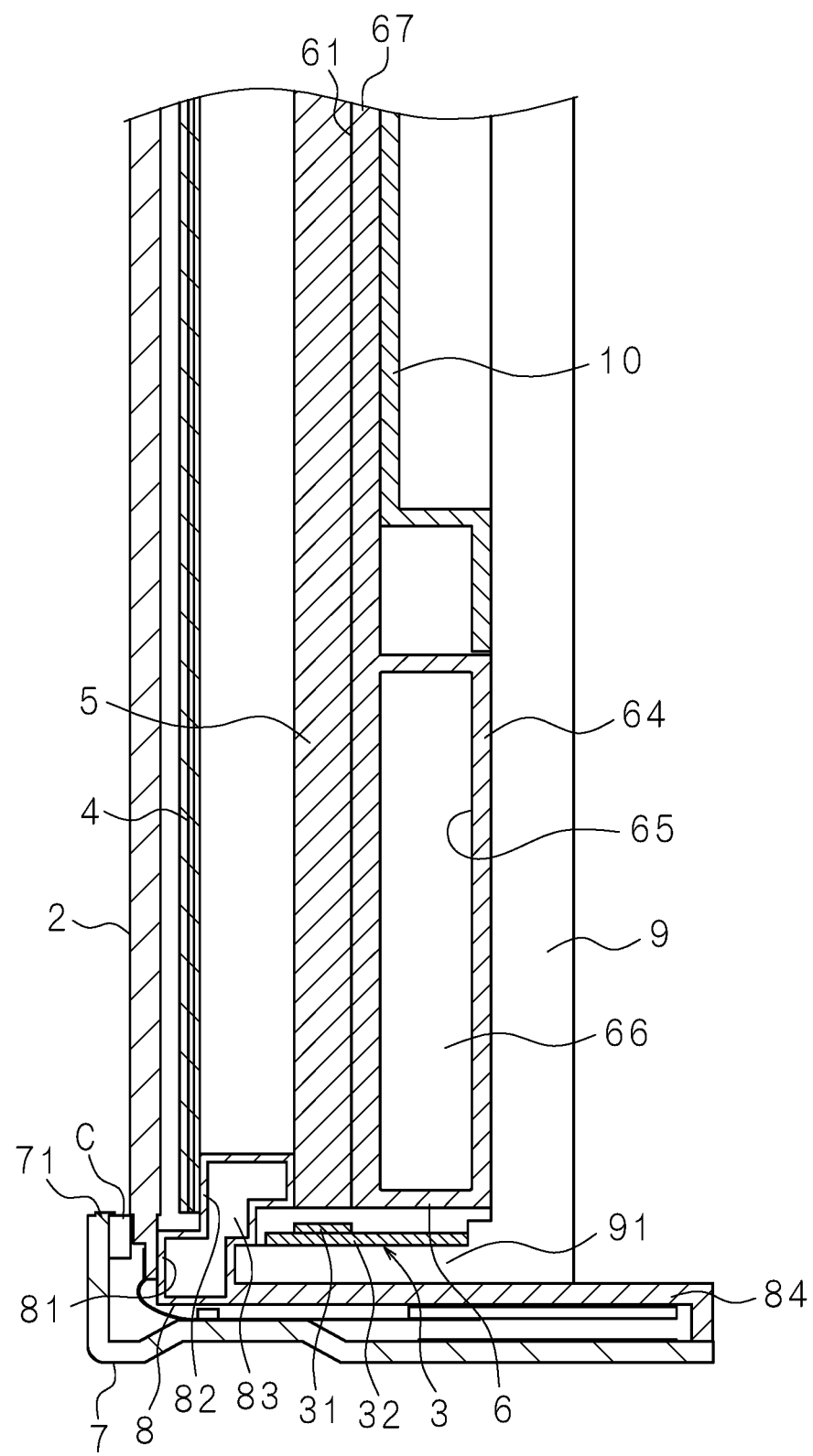
FIG. 7 is a partial longitudinal sectional view illustrating a configuration of main components of a television receiving apparatus according to Embodiment 2 of the present invention.

FIG. 7 is a partial longitudinal sectional view illustrating a configuration of main components of a television receiving apparatus 100 according to Embodiment 2 of the present invention. In the television receiving apparatus 100 according to Embodiment 2 of the present invention, only convex parts 64 are formed on the other surface of the heat absorption plate 6.

In the television receiving apparatus 100 according to Embodiment 2 of the present invention, the convex parts 64 are formed on the other surface of the heat absorption plate 6 at the edge portions of the heat absorption plate 6 having a rectangular shape along long sides thereof. More particularly, the convex parts 64 are formed only at the edge portions of the heat absorption plate 6 in the vicinity of the light source units 3. In the other surface of the heat absorption plate 6, a portion other than the convex parts 64 is a flat surface 67 which contacts with a backlight chassis 10 to be described below. The flat surface 67 is supported by the backlight chassis 10.

The convex part 64 has a hollow portion 65 inside thereof, similar to that of Embodiment 1. In addition, the coolant 66 may be injected into the hollow portion 65 of the convex part 64.

In particular, in the television receiving apparatus 100 according to Embodiment 2 of the present invention, the convex part 64 is formed only on the edge portion of the heat absorption plate 6 in the vicinity of the light source unit 3, such that it is possible to more effectively absorb heat from the light source unit 3 and the light guide plate 5.

That is, since the heat emitted by the light guide plate 5 is caused by the heat originally emitted from the light source unit 3, by having the configuration in which the convex part 64 is formed in the vicinity of the light source unit 3, the heat emitted by the light source unit 3 may be absorbed directly from the light source unit 3, and before the heat is diffused throughout the entirety of the light guide plate 5, the heat is absorbed indirectly from the edge portion of the heat absorption plate 6 in the vicinity of the light source unit 3. Accordingly, it is possible to more effectively prevent the light guide plate 5 (or the light source device 1) from being overheated.

The same parts as those in Embodiment 1 will be denoted by the same reference numerals, and will not be described in detail.

Embodiment 3

In Embodiment 1, the case in which the heat absorption plate 6 has substantially the same shape and the size as the light guide plate 5, and the convex parts 64 and the concave parts 63 are wholly formed on the other surface of the heat absorption plate 6 has been described, but the present invention is not limited thereto.

Figure 8:
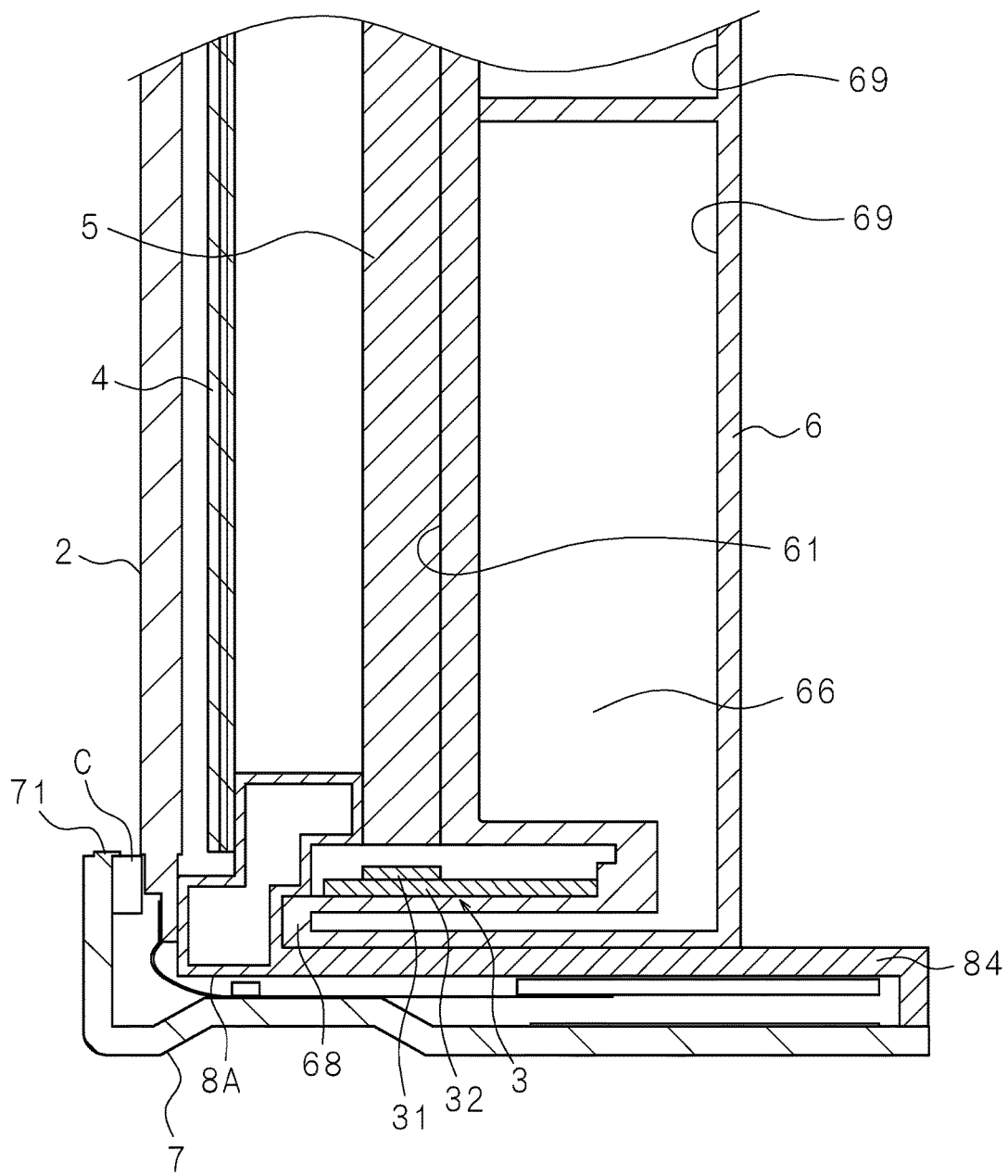
FIG. 8 is a partial longitudinal sectional view illustrating a configuration of main components of a television receiving apparatus according to Embodiment 3 of the present invention.

FIG. 8 is a partial longitudinal sectional view illustrating a configuration of main components of a television receiving apparatus 100 according to Embodiment 3 of the present invention. The television receiving apparatus 100 according to Embodiment 3 of the present invention has a configuration in which an interval holding part 8 is provided as a separate member, and the convex part 64, the concave part 63 and the heat dissipation plate 9 are eliminated.

The heat absorption plate 6 in the television receiving apparatus 100 according to Embodiment 3 of the present invention has cavities 69 inside of the heat absorption plate 6, while the convex part 64 and the concave part 63 are not formed. In addition, the cavities 69 are partitioned in a plurality of regions. Further, the other surface of the heat absorption plate 6 is flat, and is configured so as to contact with air. Furthermore, the coolant 66 is injected into the cavities 69.

Accordingly, the heat absorption plate 6 dissipates the heat emitted by the light guide plate 5 (and the light source unit 3) in the air. That is, the heat emitted by the light guide plate 5 (and the light source unit 3) is absorbed by the cavities 69 and is cooled by the coolant 66 through the one surface of the heat absorption plate 6. In addition, the heat absorbed by the cavities 69 is dissipated from the other surface of the heat absorption plate 6 in the air. That is, even though the configuration in which the heat dissipation plate is eliminated, the heat emitted by the light guide plate 5 may be effectively dissipated, and the apparatus may be made to be compact by reducing the number of components.

In addition, the heat absorption plate 6 has a bent portion 68 at an end thereof near the light source unit 3, which is bent in the thickness direction of the heat absorption plate 6. In other words, the bent portion 68 (a heat absorption part) extends from the end of the heat absorption plate 6 near the light source unit 3, at a region proximal to the other surface of the substrate 32 of the light source unit 3, along the other surface of the light source unit 3. Herein, the hollow portion 69 is formed inside of the bent portion 68, and the coolant 66 may be injected into the hollow portion 69.

Accordingly, the heat of the light source unit 3 (and the substrate 32) is diffused throughout the entirety of the heat absorption plate 6 through the bent portion 68 (coolant 66), and is dissipated from the entirety of the other surface of the heat absorption plate 6 in the air, such that it is possible to directly dissipate the heat emitted by the light source unit 3 therethrough.

The same parts as those in Embodiment 1 will be denoted by the same reference numerals, and will not be described in detail.

Further, in the above description, the case in which the interval holding part 8, the light guide plate 5 and the heat absorption plate 6 are integrally molded, and the integral molding is performed by the gas-assist molding method or the two-color molding method has been described, but the present invention is not limited thereto. These components may be integrally molded by so-called insert molding in which only the light guide plate 5 is prepared and set in the mold in advance.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display apparatus which includes a light guide plate configured to emit light from a front surface thereof, the light entering a side surface of the light guide plate, and displays an image by the light from the light guide plate, comprising:
    a heat absorption plate which is integrally molded with the light guide plate, and is configured so that a front surface of the heat absorption plate contacts with a rear surface of the light guide plate to absorb heat from the light guide plate,
    wherein the heat absorption plate has a convex part and a concave part on a rear surface of the heat absorption plate, and a first hollow portion is sealed inside the convex part without an opening facing the rear of the display apparatus,
    an optical sheet having a rear surface which faces the front surface of the light guide plate; and
    an interval holding part which is provided at edge portion of the front surface of the light guide plate, and is configured to hold an interval between the front surface of the light guide plate and the rear surface of the optical sheet,
    wherein a second hollow portion is sealed inside the interval holding part.

2. The display apparatus according to claim 1, comprising:
    a display panel configured to display an image using the light entering through the optical sheet,
    wherein the interval holding part is configured so as to hold an interval between the front surface of the optical sheet and a rear surface of the display panel.

3. The display apparatus according to claim 1, wherein the interval holding part, the light guide plate, and the heat absorption plate are integrally molded.

4. The display apparatus according to claim 1, wherein the convex part of the heat absorption plate is provided on the edge portion relating to the one side surface of the light guide plate.

5. The display apparatus according to claim 1, wherein coolant is injected into the first hollow portion sealed inside the convex part of the heat absorption plate.

6. The display apparatus according to claim 1, comprising:
    a light source provided in the vicinity of one side surface of the light guide plate,
    wherein the light source has light emitting elements and a substrate of which a front surface mounts the light emitting elements,
    a hollow heat absorption part configured to absorb heat from the substrate is provided as to facing a rear surface of the substrate, and
    the heat absorption part is integrally molded with the heat absorption plate.

7. The display apparatus according to claim 1, wherein the front surface of the heat absorption plate has a white color.

8. The display apparatus according to claim 1, comprising a heat dissipation plate which contacts with the rear surface of the heat absorption plate.

9. A display apparatus which includes a light guide plate configured to emit light from a front surface thereof, the light entering a side surface of the light guide plate, and displays an image by the light from the light guide plate, comprising:
    a heat absorption plate which is integrally molded with the light guide plate, and is configured so that a front surface of the heat absorption plate contacts with a rear surface of the light guide plate to absorb heat from the light guide plate,
    wherein the heat absorption plate has a convex part and a concave part on a rear surface of the heat absorption plate, and a hollow portion is sealed inside the convex part,
    a light source provided in the vicinity of one side surface of the light guide plate,
    wherein the light source has light emitting elements and a substrate of which a front surface mounts the light emitting elements,
    a hollow heat absorption part configured to absorb heat from the substrate is provided as to facing a rear surface of the substrate, and
    the heat absorption part is integrally molded with the heat absorption plate.

10. The display apparatus according to claim 9, comprising:
    an optical sheet having a rear surface which faces the front surface of the light guide plate; and
    an interval holding part which is provided at edge portion of the front surface of the light guide plate, and is configured to hold an interval between the front surface of the light guide plate and a rear surface of the optical sheet,
    wherein a hollow portion is sealed inside the interval holding part.

11. The display apparatus according to claim 10, comprising:
    a display panel configured to display an image using the light entering through the optical sheet,
    wherein the interval holding part is configured so as to hold an interval between the front surface of the optical sheet and a rear surface of the display panel.

12. The display apparatus according to claim 10, wherein the interval holding part, the light guide plate, and the heat absorption plate are integrally molded.

13. The display apparatus according to claim 9, wherein the convex part of the heat absorption plate is provided on the edge portion relating to the one side surface of the light guide plate.

14. The display apparatus according to claim 9, wherein coolant is injected into the hollow portion sealed inside the convex part of the heat absorption plate.

15. The display apparatus according to claim 9, wherein the front surface of the heat absorption plate has a white color.

16. The display apparatus according to claim 9, comprising a heat dissipation plate which contacts with the rear surface of the heat absorption plate.

* * * * *